United States Patent Office 3,288,501
Patented Nov. 29, 1966

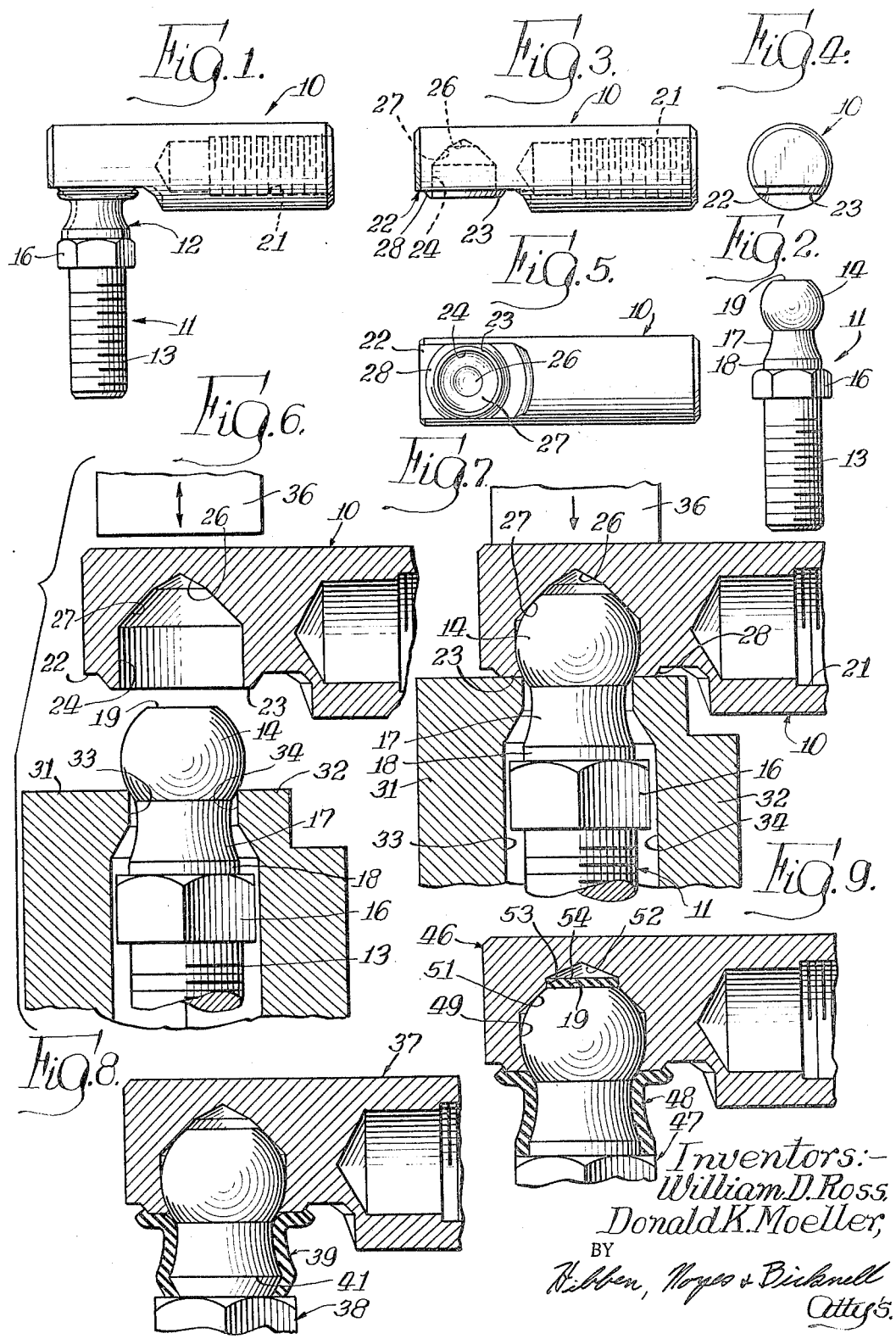

3,288,501
BALL JOINT
William D. Ross, Winnetka, and Donald K. Moeller, La Grange Park, Ill., assignors to J. J. Tourek Mfg. Co., Chicago, Ill., a corporation of Illinois
Filed Oct. 22, 1962, Ser. No. 231,936
8 Claims. (Cl. 287—90)

This invention relates to an improved ball joint construction and to a method of constructing such a joint.

A common type low-cost ball joint includes a cylindrical shell and a ball screw. The shell has a cavity formed in a longitudinal side adapted to receive a generally spherical ball formed on the ball screw. The ball is retained in the cavity by crimping the shell adjacent the edge of the ball cavity at two diametrically opposed points. While this type of joint is generally satisfactory and is relatively inexpensive, it has a number of disadvantages. It is difficult to mount a seal on the joint which will prevent dirt from entering the cavity, and the bearing surface between the ball and the shell at the outer surface of the ball does not extend entirely around the outer surface of the ball.

Joints have also been made before with a bearing surface extending entirely around the outer surface of the ball, but the ball cavity has not been formed in a longitudinal side of a cylindrical shell, and the shell has been spun over the outer surface of the ball, which is a relatively expensive operation.

Accordingly, it is an object of this invention to provide an improved inexpensive ball joint having a bearing surface extending entirely around the outer surface of the ball.

Another object is to provide a ball joint of the foregoing character, wherein the outer bearing surface between the ball and the screw is provided by a pressing operation.

Still another object is to provide a ball joint of the foregoing character, including means for effectively preventing dirt from entering the ball cavity of the joint.

A still further object is to provide an improved process for producing a ball joint of the foregoing character.

Other objects and advantages of the invention will become apparent from the following description taken in conjunction with the accompanying figures of the drawing, in which:

FIG. 1 is an elevational view of a ball joint comprising a ball screw and a shell and embodying the invention;

FIG. 2 is an elevational view of the ball screw of the joint;

FIG. 3 is a side elevational view of the shell of the joint;

FIG. 4 is an end elevational view of the shell;

FIG. 5 is an elevational view of one side of the shell;

FIG. 6 shows on an enlarged scale a step in the process of assembling the ball joint;

FIG. 7 shows a subsequent step in the assembly of the ball joint;

FIG. 8 is a fragmentary view partially in section of a modified form of ball joint; and FIG. 9 is a fragmentary view partially in section of another modified form of ball joint.

In general, a joint embodying the invention is designed to couple two members together and comprises a shell and a ball screw. The ball screw includes a shank at one end adapted to be attached to one of the two members, and a generally spherical ball shaped portion at its outer end. A reduced diameter neck is formed between the ball and the shank. The shell includes a shank adapted to be attached to the other of the two members. It further includes a flat surface having a circular step extending from and formed within the flat surface. The shell also includes a cavity for the ball shaped portion formed within the step. The center of the step substantially coincides with the axis of the cavity, and the step forms a rim or ridge around the margin of the cavity. The depth of the cavity is such that the center of the ball shaped portion is spaced inwardly from the opening of the cavity. The step at the margin of the cavity is pressed inwardly, by a pressing operation, entirely around the ball shaped portion and into sliding engagement with the outer surface of the ball shaped portion, to thereby prevent the ball shaped portion from coming out of the cavity. Preferably, a tubular resilient seal is positioned around the neck of the ball screw, a portion of the seal overlying the margin of the cavity to thereby prevent dirt from entering the cavity.

The shell is preferably formed from a cylindrical member and the ball screw is preferably formed from a hexagonal member. The generally spherical ball shaped portion and the reduced diameter neck are machined at one end of the hexagonal member, and the other end of the hexagonal member may be threaded for attachment to one of the two members to be coupled. A side of the cylindrical member adjacent one end is machined to form the flat surface and the step, and the ball cavity is drilled at the center of the step. The other end of the cylindrical member may be drilled and tapped for attachment to the other of the two members to be coupled. The ball screw is positioned on a stationary die of a press and the shell is positioned with the cavity over the ball shaped portion and enclosing the latter. The ram of the press is then brought into engagement with the shell to apply a compressive force to the step. By such compressive force, the step is annularly deformed inwardly toward the axis of the cavity and into sliding engagement with the outer surface of the ball shaped portion, thereby preventing the ball shaped portion from being withdrawn from the cavity. The seal is then positioned around the ball screw with a portion overlying the margin of the cavity.

In greater detail, FIG. 1 shows a ball point including a shell 10, a ball screw 11, and a grommet 12 which serves as a seal or dust cover. With reference to FIG. 2, the ball screw 11 includes an externally threaded shank 13 at one end, a generally spherical ball 14 at its other end, and a hexagonally shaped portion 16 intermediate the shank 13 and the ball 14. A reduced diameter neck 17 is also formed on ball screw between the ball 14 and the hexagonally shaped portion 16. This neck slopes outwardly from the ball 14 to a generally cylindrical surface 18 adjacent the portion 16, the diameter of the surface 18 preferably being less than the distance across the flats of the portion 16. The end of the ball screw having the ball 14 is shown as cut off to form a transverse end surface 19.

The shell 10 (FIGS. 3 to 5) includes a cylindrical shank having an internally threaded bore 21 at one end. Adjacent its other end on a longitudinal side of the shell 10 is formed a flat surface 22 and a circular outwardly extending step 23 within the surface 22. A generally cylindrical ball cavity 24 is formed in the shell 10, the axis of the cavity being coincident with the center of the step 23 and the axis of the cavity being substantially normal to the surface 22. The diameter of the cavity 24 is less than the diameter of the step 23 to thereby form a rim around the cavity, and the outer side of the step away from the cavity slopes toward the flat surface.

The inner end of the cavity is preferably cone shaped and is formed at two angles, the innermost surface 26 making a greater angle with the cavity axis than the surface 27 adjacent the innermost surface 26. The depth of the cavity is such that the center of the ball 14 is located between the outer opening of the cavity and the axis of the shell. When the ball joint is assembled (FIG. 7), the ball 14 is positioned within the cavity 24 with the inner surface of the ball engaging the surface 27 of the cavity, and the step 23 is deformed inwardly into engagement with the outer surface of the ball to prevent the ball from being withdrawn.

The grommet 12 is a tubular member, preferably made of a durable flexible material such as neoprene rubber. It is positioned around the neck 17 of the ball screw, with one end overlying the margin of the cavity 24 and engaging the step 23, to prevent dirt from entering the cavity 24. The grommet 12 extends from the step 23 to the hexagonal portion 16 and it overlies the cylindrical surface 18 of the ball screw. The diameter of this surface 18 is preferably such that the outer surface of the grommet 12 is flush with the flats of the hexagonal portion 16, so that the portion 16 may be gripped by a wrench (not shown) and not damge the grommet 12. The grommet 12 is sufficiently flexible that the ball screw 11 may be moved readily relative to the shell 10. Preferably, the diameter of the neck 17 is small enough, relative to the diameter of the opening of the cavity 24 after the step is deformed, to permit true conical movement of the ball screw 11 relative to the shell 10 through a minimum angle of about 35°.

The ball screw 11 is preferably formed from hexagonal stock, and the shank 13 with its threads and the ball 14 and the neck 17 are machined by turning operations. The shell 10 is preferably formed from cylindrical stock. The bore 21 is drilled and threaded at one end, and the surface 22 and the circular step 23 are machined on one side. The ball cavity 24 is drilled into the shell 10 at the center of the step 23.

The ball joint is assembled by positioning a ball screw 11 in a press having two lower die halves 31 and 32 (FIGS. 6 and 7). The die halves have openings 33 and 34 which receive the ball screw 11 and are movable from spaced apart positions (not shown), to prevent the ball screw 11 to be positioned within the openings 33 and 34, to a closed position where the ball 14 rests on the edges of the openings 33 and 23. The shell 10 is positioned with the cavity 24 over and enclosing the ball 14, and ram 36 of the press is then brought downwardly against the side of shell 10 opposite to the step 23. The ram forces the step 23 against the lower die halves 31 and 32 and the force is sufficient to deform the step 23 inwardly toward the axis of the cavity into engagement with the outer surface of the ball 14. Either the length of stroke of the ram 36 or the amount of force applied by the ram 36 is controlled to deform the step 23 sufficiently to bring it into sliding engagement with the ball 14, and yet not enough to prevent movement of the ball relative to the shell 10. The sloped outer side 28 of the step 23 causes the step to be deformed inwardly when the step is compressed. After deformation of the step, the ram 36 is raised, the lower dies halves 31 and 32 are separated, and the assembled ball joint is removed.

FIG. 8 shows an alternative construction of the ball joint which may be assembled in the manner just described. This joint includes a shell 37, a ball screw 38, and a grommet or seal 39. The shell 37 and the grommet 39 are identical with the shell 10 and grommet 12, respectively, shown in FIGS. 1 to 7. The ball screw 38 differs from the ball screw 11 only in the construction of the neck between the ball and the hexagonal portion. The neck of the ball screw shown in FIG. 8 slopes inwardly from both sides of a plane 41 intermediate the ball and the hexagonal portion, and the seal 39, being flexible, conforms to the contour of this neck. The diameter of the neck adjacent the hexagonal portion of this ball screw 38 is substantially less than the distance across the flats of this portion, so that the outer surface of the seal 39 is spaced inwardly from the flats and cannot be damaged by a wrench.

In FIG. 9 is shown still another alternative construction of the ball joint, which includes a shell 46, a ball screw 47, and a grommet or seal 48. The ball screw 47 and the seal 48 may be identical with the ball screw 11 and the grommet 12, respectively, of FIGS. 1 to 7. The shell 46 includes a ball cavity 49 having, at its inner end, two inwardly tapered surfaces 51 and 52 separated by a generally cylindrical coaxial surface 53. A washer 54, preferably made of a material such as nylon or rubber is positioned between the inner end of the ball screw 47 and the innermost end of the cavity 49. The diameter and the width of the washer 54 are substantially equal to the diameter and width of the surface 53. This washer 54 may be provided to cushion movement of the ball screw and to maintain proper tension on the ball of the ball screw. The ball joint shown in FIG. 9 may also be constructed by the previously described method with the additional step of positioning the washer between the ball and the shell.

We claim:

1. A ball joint for connecting two members together, comprising a ball screw and a shell, said ball screw including a generally spherical ball-shaped portion at one end and a portion at its other end for attachment with one of said two members, said shell being adapted to be attached to the other of said members and including a flat surface having a generally circular step formed substantially within the boundaries of said flat surface, said shell having a cavity for said ball-shaped portion formed within said step, the axis of said cavity substantially coinciding with the center of said circular step, the axis of said cavity being substantially normal to said flat surface, and the depth of said cavity being such that the center of said ball-shaped portion is within said cavity, said step extending radially inwardly toward the axis of said cavity into engagement with said ball-shaped portion to prevent the latter from being withdrawn from said cavity, said shell being generally cylindrical longitudinally except for said flat surface and said flat surface and said step being on a longitudinal side of said shell.

2. A ball joint as in claim 1, wherein the outer side of said step slopes toward said flat surface.

3. A ball joint as in claim 1, and further including a reduced diameter neck on said ball screw adjacent said ball-shaped portion, and a tubular resilient seal positioned around said neck with a portion of said seal overlying the margin of said cavity.

4. A ball joint as in claim 3, wherein one end of said seal engages said step.

5. A ball joint for connecting two members together, comprising a ball screw and a shell, said ball screw including a generally spherical ball-shaped portion at one end and a portion at its other end for attachment with one of said two members, said shell being adapted to be attached to the other of said members and including a flat surface having a generally circular step formed substantially within the boundaries of said flat surface, said shell having a cavity for said ball-shaped portion formed within said step, the axis of said cavity substantially coinciding with the center of said circular step, the axis of said cavity being substantially normal to said flat surface, and the depth of said cavity being such that the center of said ball-shaped portion is within said cavity, said step extending radially inwardly toward the axis of said cavity into engagement with said ball-shaped portion to prevent the latter from being withdrawn from said cavity, a reduced diameter neck on said ball screw adjacent said ball-shaped portion, and a tubular resilient seal positioned around said neck with a portion of said seal overlying the margin of said cavity, wherein said portion adapted to be attached to said one member is threaded, and further including a hexagonally shaped portion on said ball screw between said neck and said threaded portion, and said seal extends from said hexagonally shaped portion to said shell.

6. A ball joint as in claim 5, wherein the outer surface of said seal is substantially flush with the flats of said hexagonally shaped portion.

7. A ball joint as in claim 5, wherein said neck slopes inwardly on both sides of a plane intermediate said ball-shaped portion and said hexagonally shaped portion, and said seal conforms to the contour of said neck.

8. A ball joint for connecting two members together, comprising a ball screw and a shell, said ball screw including a generally spherical ball at one end and being adapted to be attached at its other end to one of said two members, said shell being generally cylindrical longitudinally and having a cavity adapted to receive said ball and formed in one longitudinal side thereof, said cavity being sufficiently deep that the center of said ball is within said cavity, the portion of said shell about the opening of said cavity being substantially flat and substantially normal to the axis of said cavity, and a substantially circular step formed on said shell within the boundaries of said flat portion around said opening of said cavity, said step extending radially of the cavity inwardly into engagement with said ball and decreasing the opening of the cavity and preventing said ball from being withdrawn from said cavity.

References Cited by the Examiner

UNITED STATES PATENTS

| | | | |
|---|---|---|---|
| 1,123,796 | 1/1915 | Porter et al. | |
| 1,330,158 | 2/1920 | Arnold. | |
| 1,621,667 | 3/1927 | Hayes. | |
| 2,361,046 | 10/1944 | Molly | 287—87 X |
| 2,470,210 | 5/1949 | Booth | 287—87 |
| 2,618,049 | 11/1952 | Flumerfelt | 29—441 |
| 2,855,665 | 10/1958 | Alldredge | 29—441 |
| 2,904,874 | 9/1959 | Norton | 29—441 X |
| 2,922,670 | 1/1960 | Davies et al. | |
| 2,942,901 | 6/1960 | Booth | 287—90 |
| 2,999,709 | 9/1961 | Melton et al. | 287—90 |

FOREIGN PATENTS

| | | |
|---|---|---|
| 854,184 | 1/1940 | France. |
| 667,073 | 2/1952 | Great Britain. |

CARL W. TOMLIN, *Primary Examiner.*

A. V. KUNDRAT, *Assistant Examiner.*